United States Patent
Littlewood et al.

(10) Patent No.: US 10,874,063 B2
(45) Date of Patent: Dec. 29, 2020

(54) SELF WATERING BOTTLE PLANTER INSERT

(71) Applicant: Urban Leaf Technologies Inc., New York, NY (US)

(72) Inventors: Nathan D. Littlewood, Brooklyn, NY (US); Robert M. Elliott, New York, NY (US)

(73) Assignee: Urban Leaf Technologies, Inc., New York, NY (US)

( * ) Notice: Subject to any disclaimer, the term of this patent is extended or adjusted under 35 U.S.C. 154(b) by 374 days.

(21) Appl. No.: 15/892,807

(22) Filed: Feb. 9, 2018

(65) Prior Publication Data

US 2019/0045730 A1 Feb. 14, 2019

Related U.S. Application Data

(60) Provisional application No. 62/457,072, filed on Feb. 9, 2017.

(51) Int. Cl.
| | |
|---|---|
| *A01G 31/00* | (2018.01) |
| *A01G 31/02* | (2006.01) |
| *A01G 24/00* | (2018.01) |
| *A01G 24/28* | (2018.01) |
| *A01G 27/00* | (2006.01) |
| *A01G 27/02* | (2006.01) |
| *A01G 27/04* | (2006.01) |
| *A01G 27/06* | (2006.01) |
| *A47G 7/00* | (2006.01) |
| *A47G 7/07* | (2006.01) |
| *A01G 24/23* | (2018.01) |
| *B65D 81/36* | (2006.01) |

(52) U.S. Cl.
CPC .......... *A01G 31/02* (2013.01); *A01G 24/00* (2018.02); *A01G 24/23* (2018.02); *A01G 24/28* (2018.02); *A01G 27/00* (2013.01); *A01G 27/02* (2013.01); *A01G 27/04* (2013.01); *A01G 27/06* (2013.01); *A01G 31/00* (2013.01); *A47G 7/00* (2013.01); *A47G 7/07* (2013.01); *B65D 81/36* (2013.01)

(58) Field of Classification Search
CPC .......... A01G 27/04; A01G 27/06; A47G 7/07
See application file for complete search history.

(56) References Cited

U.S. PATENT DOCUMENTS

| | | | | |
|---|---|---|---|---|
| 2,084,005 A | * | 6/1937 | Richards | A01G 27/06 47/80 |
| 2,332,352 A | * | 10/1943 | Smith | A47G 7/07 47/41.13 |

(Continued)

OTHER PUBLICATIONS

B.A. Kratky, "Three Non-Circulating Hydroponic Methods for Growing Lettuce" Proceedings of the Intern. Symposium on Soilless Culture . . . Acta. Hort. 843:65-72. 8pgs, date 2009.

*Primary Examiner* — Christopher D Hutchens
*Assistant Examiner* — Steven J Shur
(74) *Attorney, Agent, or Firm* — Myers Wolin, LLC (57) ABSTRACT

The self watering bottle planter insert allows a regular bottle to be transformed into a hydroponic planter. The self watering bottle planter insert is insertable into a bottle and removes the need for a separate source of nutrients. The planter uses composite media with an enriched substrate layered beneath a more standard hydroponic growth media to add nutrients to the water for the life cycle of the plant.

25 Claims, 8 Drawing Sheets

(56) References Cited

U.S. PATENT DOCUMENTS

| | | | |
|---|---|---|---|
| 3,373,009 A | 3/1968 | Pruitt et al. | |
| 3,995,397 A * | 12/1976 | Despard, III | A01G 9/02 47/81 |
| 4,106,235 A * | 8/1978 | Smith | A01G 31/02 47/59 R |
| 4,165,835 A * | 8/1979 | Dearling | A61L 9/12 239/51.5 |
| 4,221,749 A | 9/1980 | Dedolph | |
| 4,328,641 A * | 5/1982 | Tesch | A01G 31/00 47/59 R |
| 4,329,812 A * | 5/1982 | Carlisle | A01G 31/02 47/59 R |
| 4,369,598 A * | 1/1983 | Beckwith | A01G 9/024 47/61 |
| 4,397,114 A * | 8/1983 | Skaife | B65D 85/52 47/81 |
| 4,403,446 A * | 9/1983 | Wolfe | A01G 24/00 47/62 R |
| 4,669,217 A | 6/1987 | Fraze | |
| 4,803,803 A | 2/1989 | Moffet, Jr. | |
| 5,111,614 A * | 5/1992 | Holtkamp, Sr. | A01G 27/04 47/81 |
| 5,225,342 A * | 7/1993 | Farrell | A01G 5/06 435/430 |
| 5,826,374 A * | 10/1998 | Baca | A01G 31/02 47/62 E |
| 5,927,007 A * | 7/1999 | Oda | B65D 51/1616 47/60 |
| 6,006,472 A * | 12/1999 | Holtkamp, Jr. | A61L 9/127 47/79 |
| 6,418,664 B1 * | 7/2002 | Shaw | A01G 27/04 47/79 |
| 6,918,207 B2 * | 7/2005 | Dai | A01G 31/02 47/81 |
| 7,024,818 B2 * | 4/2006 | Maniscalco | A01G 9/02 47/63 |
| 7,260,914 B2 * | 8/2007 | O'Connor | A47G 7/07 47/41.01 |
| 7,587,859 B2 * | 9/2009 | Bradley | A01G 9/02 47/60 |
| 8,667,734 B2 * | 3/2014 | Johnson | A01G 31/02 47/62 R |
| 9,027,277 B2 * | 5/2015 | Castleberry | B65D 85/505 47/41.01 |
| 9,485,924 B1 * | 11/2016 | Frye | A01G 27/06 |
| 2005/0257424 A1 | 11/2005 | Bissonnette et al. | |
| 2012/0240466 A1 * | 9/2012 | Anderson | A01G 9/045 47/80 |
| 2013/0067814 A1 * | 3/2013 | Riley | A01G 31/02 47/62 R |
| 2013/0232872 A1 * | 9/2013 | Bryan, III | A01G 31/02 47/62 C |
| 2014/0196367 A1 * | 7/2014 | Hasagawa | A01G 27/04 47/62 R |
| 2016/0316640 A1 | 11/2016 | Lepp et al. | |
| 2018/0014482 A1 * | 1/2018 | Al-Anzi | A01G 13/0237 |

\* cited by examiner

SELF WATERING BOTTLE PLANTER INSERT

This application is being filed as a nonprovisional application under 35 U.S.C. § 111(a) and 37 CFR § 1.53(b) claiming priority to provisional application No. 62/457,072 filed on Feb. 9, 2017, the contents of which is incorporated herein by reference thereto.

The present invention relates to a self watering bottle planter insert that allows a regular bottle to be transformed into a hydroponic planter. The self watering bottle planter is insertable into a bottle and removes the need for a separate source of nutrients. The planter uses composite media with an enriched substrate layered beneath a more standard hydroponic growth media.

BACKGROUND OF THE INVENTION

A common cause of plants dying is a lack of attention and watering. Plants kept in small pots with soil do not retain significant volumes of water, and often require watering at least once per day. For busy people this constant maintenance requirement can be burdensome. A common method of addressing the need for regular watering is to use the hydroponic method for growing plants. The hydroponic method or soil-less growth of plants, comprises the cultivation of plants by placing the roots in a nutrient solution or water rather than soil. In some instances a light soil or similar material (e.g. peat moss, coco coir, rock wool, or even some man-made materials) are used to accommodate the seed and seedling, but as the plant matures its roots grow into the water.

A water tight container such as that described by U.S. Pat. No. 6,918,207 will not only prevent water from leaking out of the container, but it will also prevent air from entering the container. The root systems of plants require oxygen to survive, and in an oxygen deprived environment the plant will not flourish.

Existing hydroponic devices including U.S. Pat. Nos. 6,918,207 and 7,587,859 include a component that performs the common function of holding the plant and/or plant substrate. In the case of U.S. Pat. No. 6,918,207 this component is referred to as the "planter unit", and in U.S. Pat. No. 7,587,859 "plant receiving depressions". Holes in the bottom of both devices perform a similar function; allowing the entry or water into the component such that it may be utilized by the roots of the plant. However, these components also lack an important functionality—being the ability to allow the roots of the plant to extrude outside of the component. The roots of the plant are therefore constrained in a very small area, leading to a high likelihood of the plant becoming root-bound.

Existing hydroponic devices including U.S. Pat. Nos. 6,918,207 and 7,587,859 require containers or water reservoirs of specific dimensions. These are not common household items, and rather need to be ordered from a specialist manufacturer. This involves significant packaging, transport and wastage. When hydroponic system require the use of many specialized components, environmental benefits are compromised.

Existing hydroponic devices call for the use of a container or reservoir made of glass, acrylic, plastic or other materials to hold the water or nutrient solution. Common embodiments of glass, acrylic and plastic are clear. Clear glass, acrylic or plastic allows the full spectrum of light to pass through it to the water. Water containing even a small amount of nutrients, as hydroponic water typically does, will grow algae. The algae which will grow in the water could be expected to turn the water green, and deplete the water of oxygen, having an adverse impact on the health of the plant.

U.S. Patent Publication No. US2005/0257424 discloses a hydroponic system that relies on the preparation of nutrient solution by adding liquid or powdered nutrients to water.

U.S. Patent Publication No. US2016/0316640 discloses an even distribution of nutrient in soil. U.S. Pat. No. 3,373,009 discloses a leach resistant nutrient mixture. Both of these discuss nutrient enriched plant growing substrates with a focus on soil based growing.

Hydroponic growth media is known. U.S. Pat. No. 4,803,803 discloses small tufts of mineral wool. U.S. Pat. No. 4,221,749 discloses soil mixture particles distributed throughout a body of spongy polymer fibers. U.S. Pat. No. 4,669,217 discloses a sterile, low water retention linear foam plastic. None of these hydroponic growth media are enriched with sufficient nutrients to support the entire life cycle of a plant.

One hydroponic technique is disclosed in the literature. Kratky, B. A. 2009. *Three Non-Circulating Hydroponic Methods for Growing Lettuce*, Acta. Hort. 843:65-72. The Kratky method is generally known to be the simplest of all hydroponic techniques. It involves the roots of a plant dangling in a body of water below. The plant roots suck up water and nutrients, keeping the plant alive. The Kratky method of hydroponics has many different form factors and potential reservoirs—including a pond, bucket, or specially made plastic reservoir. This system is commercially available at: https://www.modsprout.com/collections/herb-kits/products/garden-jar-three-pack-herb-essentials and https://www.homedepot.com/p/Viagrow-Black-Bucket-Deep-Water-Culture-Hydroponic-System-V1DWC/203548975. This method has never used a bottle as a reservoir.

Previous hydroponic grow chambers form a water or air tight seal at the mouth or opening of the vessel in which it resides, thereby preventing the flow of oxygen to the roots of the plant.

OBJECTS OF THE INVENTION

It is an object of the present invention to create a hydroponic planter that is insertable into a bottle and which removes the need for separate source nutrients as is typically required in hydroponic plant production. The planter uses composite media with an enriched substrate layered beneath a more standard hydroponic growth media. Water in the bottle provides a supply of water to the plant.

It is a further object of the present invention to create a hydroponic growth chamber that does not constrain the growth of the plant roots downward into the container. Vertical slits or apertures in the walls of the support frame of the invention allow the plant roots to extend freely into the container. This is far less likely to result in the plant becoming root bound.

SUMMARY OF THE INVENTION

The purpose of this invention is to provide an easy and low-maintenance method for keeping plants alive. The self watering bottle insert planter can be used for growing a plant, such as herbs, vegetables, flowers or ornamental plants, out of the top of a bottle which can be glass, plastic, or some other material. All that is required is water in the bottle. The nutrients in the bottle insert support the plant for the life cycle of the plant.

The preferred embodiment of the invention includes a substrate enriched with nutrients within a support frame with an open framework of vertical legs. The use of this invention, when combined with a bottle filled with water creates a highly favorable environment for growing plants hydroponically. The nutrients from the substrate leach into the water providing nutrients for the plant during its life cycle.

The invention is a bottle insert containing a plant substrate, where the insert is adapted to be inserted into a neck of a bottle, for facilitating growth of a plant and plant roots. The bottle insert includes a support frame with a top retainer ring, an open framework of vertical legs having upper frame segments and lower frame segments, and a base coupling terminal portions of the vertical legs. The plant substrate is encased in the open framework and adapted to support the plant root. The substrate defines a wick adapted to vertically draw up liquid from the bottle to the seed or plant. The support frame is adapted to be inserted into the neck of the bottle and retained atop the bottle by the top retainer ring.

The invention is also a bottle insert for facilitating the growth of plants comprising a support frame with a top retainer ring, an open framework of vertical legs having upper frame segments and lower frame segments, and a base coupling terminal portions of the vertical legs. The substrate is encased in the open framework and adapted to support a plant root system. The substrate defines a wick adapted to vertically draw up liquid from a bottle container. There is at least one vertical aperture, wherein the apertures may be continuously vertically open or the at least one vertical aperture may have periodic lateral support segments to assure vertical stability. The support frame is inserted into a neck of a bottle and retained atop the bottle by the top retainer ring.

The invention also includes a bottle insert having a form factor adapted to fit within a bottle neck having an inner diameter no larger than 22 mm and no smaller than 18 mm. The support frame has a length no greater than 130 mm.

Further objects and advantages of the present invention can be found in the detailed description of the preferred embodiments when taken in conjunction with the accompanying drawings.

DETAILED DESCRIPTION OF THE PREFERRED EMBODIMENTS

The description that follows is not intended to limit the scope, applicability, or configuration of the invention in any way; rather it is intended to provide a convenient illustration for implementing various embodiments of the invention. As will become apparent, various changes may be made in the function and arrangement of the elements described in these embodiments without departing from the scope of the invention. It should be appreciated that the description herein may be adapted to be employed having different shape bases, covers, and insert portions and the like and still fall within the scope of the present invention. Thus, the detailed description herein is presented for the purpose of illustration only and not of limitation.

Figure 1:
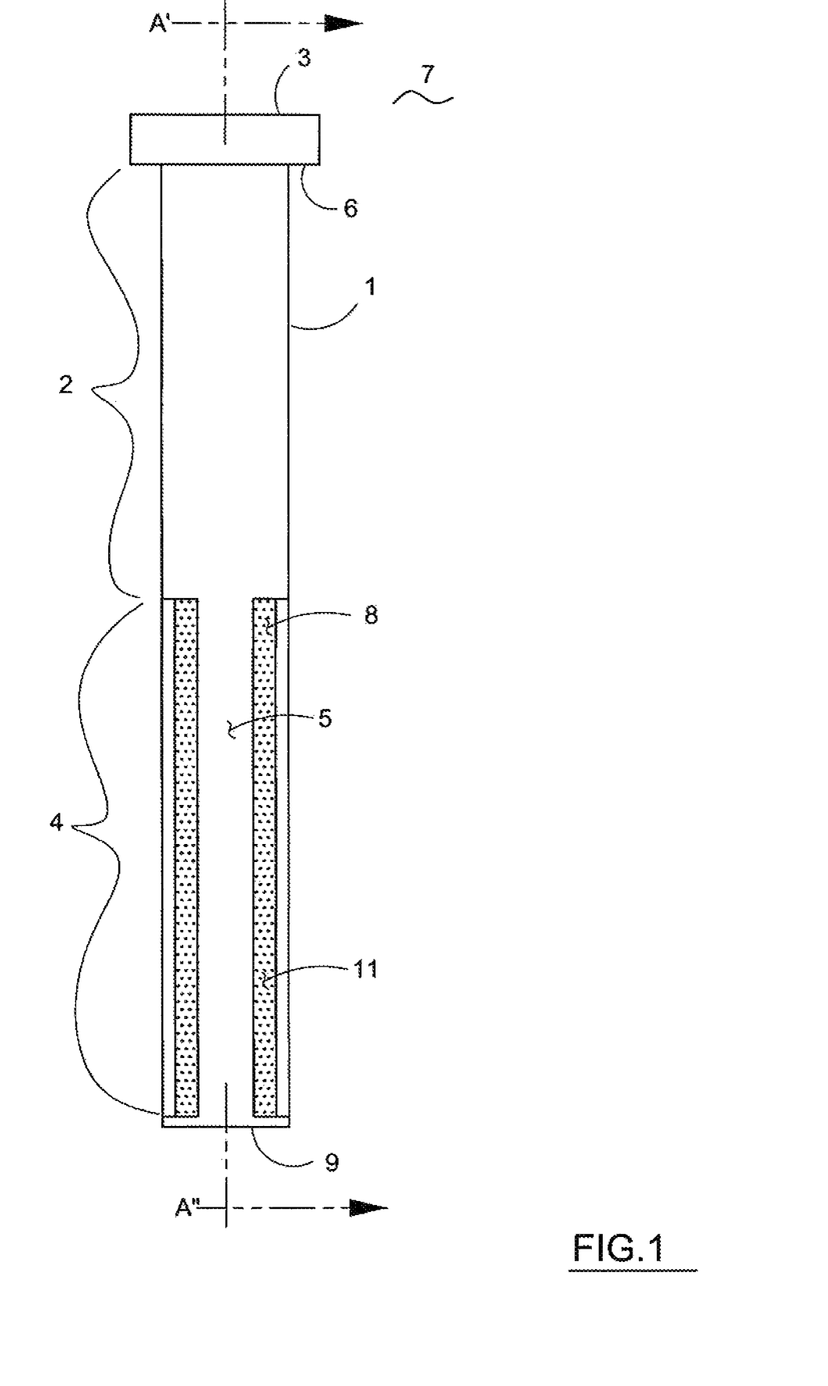
FIG. 1 is a side view of the bottle insert.
Figure 2:
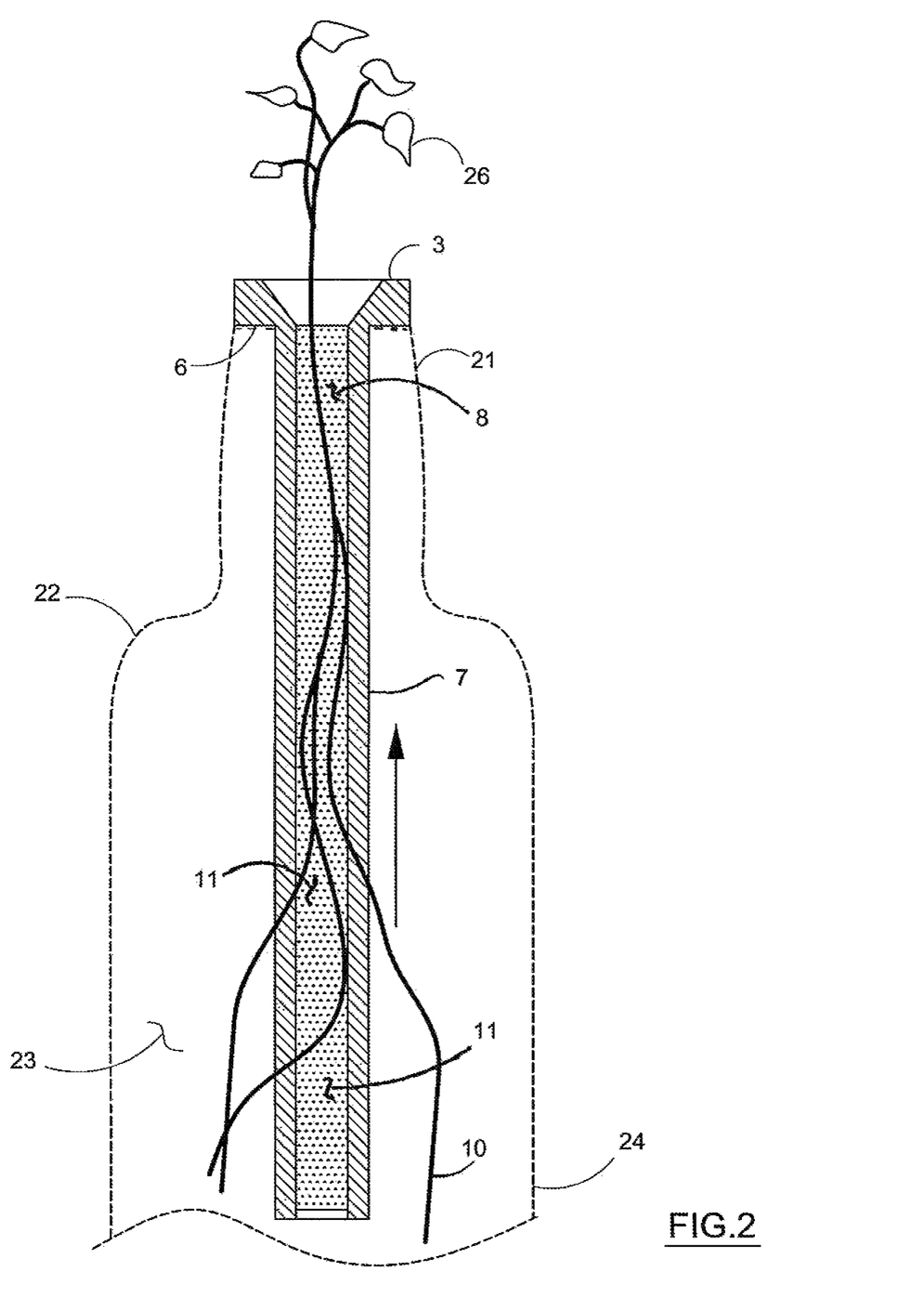
FIG. 2 is a cross-section of the bottle insert from the perspective of section line A' to A".

FIG. 1 shows a front view of the bottle insert invention. FIG. 2 shows the bottle insert invention having been inserted into the neck of a wine bottle (dashed lines 23). The wine bottle is partially filled with water. The slots in the bottom of the insert tube are visible in FIG. 1 and plant substrate 8 is shown in FIG. 2.

In FIG. 2, seeds, having initially been placed in the top region of the substrate, have formed seedlings 26 with a stem and leaves growing upward (toward light) and the roots 10 have extended down through the substrate and into the container below, where they are able to reach the water or nutrient solution. As mentioned elsewhere in this application, alternative embodiments of this invention may not include a plastic tube with slits, yet still perform the same function—being to support the plant substrate from falling into the container.

One preferred embodiment of the invention of self watering bottle planter comprises: a plant substrate framework unit, wherein the plant substrate serves as both a medium to support the plant seed, seedling and root, as well as performing a wicking function via capillary action. A plastic tube, with a flange at one end, serves the purpose of holding the substrate unit in place at the top, mouth or neck of the container or bottle. When a seed or seedling is placed in the substrate, it is kept moist via the capillary action of the substrate itself. The plant substrate as its bottom end in communication with the water in the bottle. As the seedling grows, its roots extend downward through the substrate toward the water or nutrient solution below. The roots of the small plant will soon outgrow the substrate itself, and via the slits or channels in the preferred embodiment are able to grow uninhibited into the container.

At the same time as the roots are growing down into the bottle container, the small seedling grows toward its light source (commonly upward). Unlike U.S. Pat. No. 6,918,207, the invention does not form a water or air tight seal at the mouth or opening of the vessel in which it resides, thereby allowing the flow of oxygen to the roots of the plant. Unlike U.S. Pat. Nos. 6,918,207 and 7,587,859 which also include a component that serves the function of supporting the plant and substrate, an important difference with the present invention is that the invention does not constrain the growth of the plant roots downward into the container. Vertical slits in the walls of the plastic tube or open framework allow the plant roots to extend freely into the container. This invention is far less likely to result in the plant becoming root bound. Although the preferred embodiment includes a plastic tube open framework, with a flange or retaining ring at one end, the invention can be constructed as otherwise disclosed and explained herein.

Figure 4:
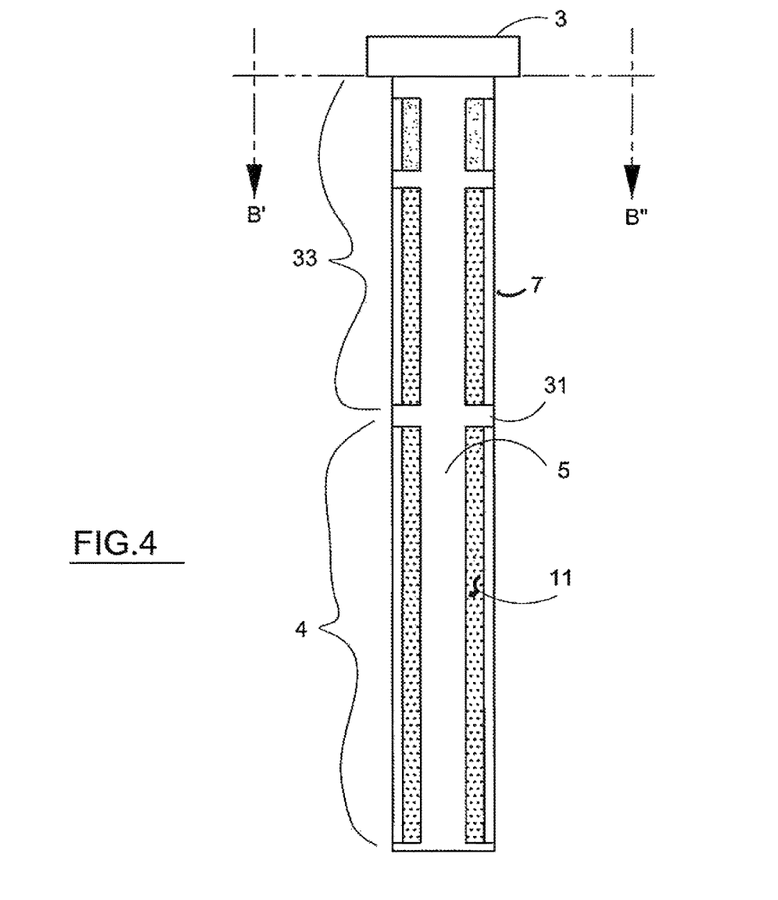
FIG. 4 is a side view of the bottle insert.
Figure 6:
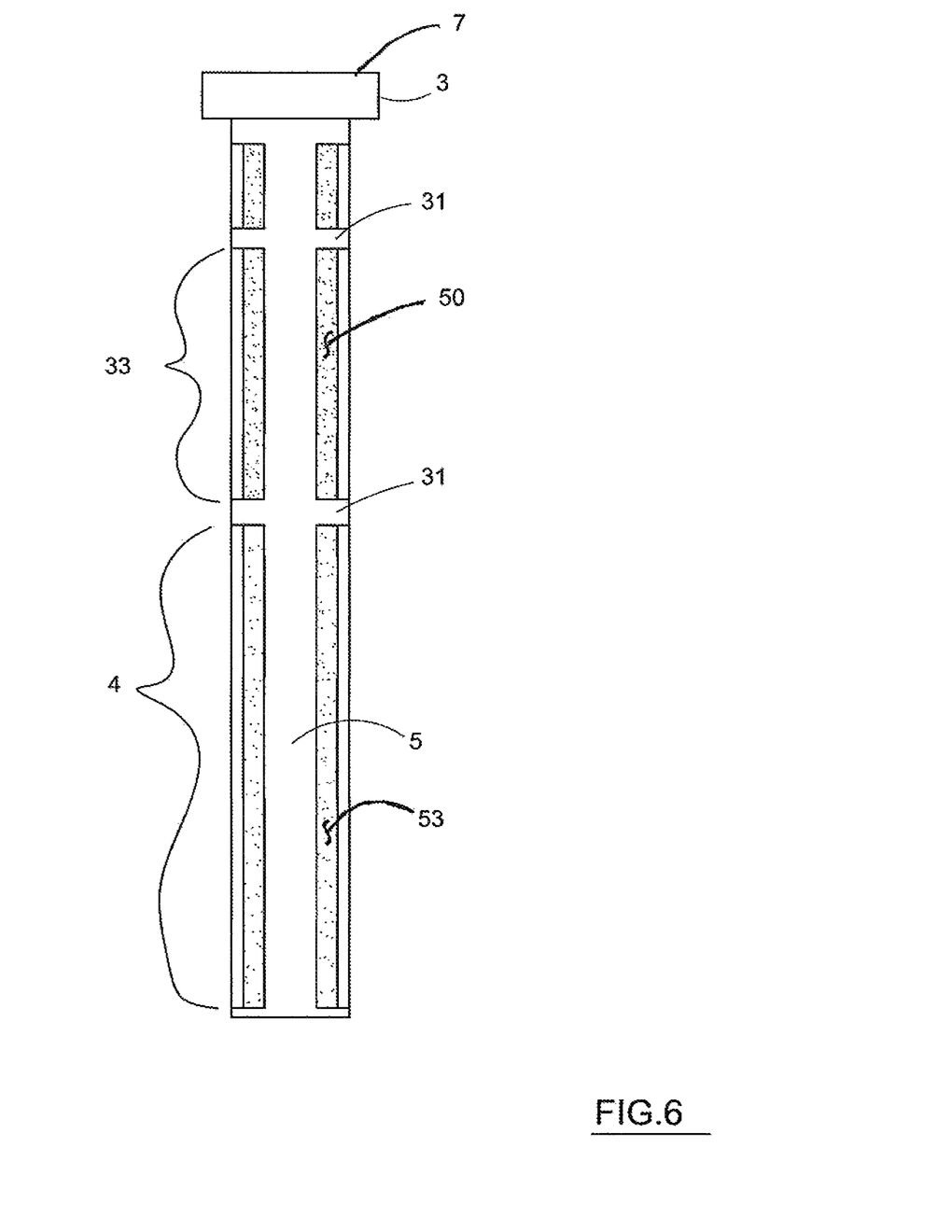
FIG. 6 is a side view of the bottle insert.

As shown in FIG. 1, in one embodiment, the self watering bottle planter insert 7 comprises a support frame 1 with vertical legs 5 and lateral cross frame members forming a base 9. The legs 5 form an open framework. The framework can take many shapes, but preferably the open framework has openwork along its length at different vertical locations thereby permitting the wicking action to draw up water into the plant substrate and also permitting root growth outboard of the open framework and into the adjacent bottle region. The open framework may have vertical slots shown in the drawings or may have many apertures to establish the wicking action and permitting outboard root growth. In FIG. 1, the support frame 1 has an upper closed frame segment 2 and a lower open segment 4. As shown in FIGS. 4 and 6, in alternate embodiments, both frame segments 4 and 33 define openwork. The openwork may be rectangular, square, round or oval, as needed. The framework supports and generally encases plant substrate 8 therein, that is, inside the framework. The substrate 8 is encased in the upper framework segment 2 and lower framework segment 4 or is solely encased in lower segment 4. Referring back to FIG. 1, the substrate 8 serves as both a medium to support the seed and seedling, as well as performing a wicking function via capillary action. The substrate 8 can be made of one or a combination of various hydroponic substrates and may be enriched with nutrients. The support frame 1 can be a plastic or metal tube. The support frame 1 has a top retainer ring 3 formed as flange 6 at the upper, outer terminal end, which serves the purpose of holding the bottle insert 7 in place at the top, mouth or neck of the container or bottle.

The lower open segment 4 is composed of vertical legs 5 and open slits or apertures 11. There are typically 3-4 vertical legs 5 in a bottle insert 7. The lower open frame segments 4 allow the roots 10 of the plant 26 to grow through and out of the bottle insert 7 and into the cavity of the bottle. Alternative embodiments may include a pin or small rod passing through the substrate 8 and residing in a similar location as the flange 6 shown in the preferred embodiment.

In FIG. 2, the bottle insert 7 is shown inserted into a bottle 24. FIG. 2 is a cross-section of the bottle insert 7 from the perspective of section line A' to A". The bottle insert 7 is held in the bottle neck 21 by the flange 6 of the top retainer ring 3 resting on the bottle lip. The bottle insert 7 extends down into the bottle 24 typically extending beyond the bottle shoulders 22 and into the bottle body cavity 23. This allows the lower portion of the bottle 24 to be filled with water, thus providing water for the plant 26 in the bottle insert 7. The roots 10 grow out of the bottle insert 7 through the slits or apertures 11. The substrate 8 creates a capillary action wicking the water up to the plant 26.

As shown in FIG. 2, when seeds or seedlings are placed in the substrate 8 of the self watering bottle insert 7 and it is inserted into a bottle 24 with water in it, the seed is kept moist via the capillary action of the substrate 8. The substrate 8 is kept moist because its bottom end is in communication with the water below. As the seedling grows, its roots 10 extend downward through the substrate 8 toward the water or nutrient solution below. The roots 10 of the small plant 26 will soon outgrow the substrate 8 itself and protrude from the bottle insert 7 via the slits 11 or channels. Accordingly, plants 26 are able to grow uninhibited into the bottle 24. At the same time as the roots are extending down into the bottle 24, the small seedling grows toward its light source, which is commonly upward.

The self watering bottle insert 7 may be used in any common household bottles 24, such as empty glass bottles 24. In 2013 Americans generated 254 million tons of trash. Reuse of common bottles 24 as planters would help reduce trash. Optionally, the self watering bottle insert 7 may utilize a specially made vessel or container for the purpose of holding water or nutrient solution. The self watering bottle insert 7 planter uses a bottle 24 or container that might have otherwise been thrown away. In one embodiment, a glass wine bottle 24 is used as a container of vessel for holding the water or nutrient solution. Wine bottles 24 are often green or brown and are particularly well suited for the function of container or reservoir owing to their light filtering properties. Tinted or colored materials block colors other than their own. For example when one looks through rose colored glasses the world appears pink; owing to the fact that blue, green and yellow light has been blocked from passing. Similarly, a green or brown wine bottle will only allow the green or brown spectrum of light to pass through.

Although plants and algae are capable of using the full spectrum of light for the purpose of photosynthesis, they derive most of their light energy from the blue and red frequencies of light. This is why hydroponic grow lights often appear pink/purple in color. The green light which will pass through a green bottle 24 is largely unusable to the algae which might otherwise form were a clear bottle 24 to be used. Since green light is largely invisible to plants and algae their growth can be inhibited. Thus, use of a green or brown bottle 24 will inhibit algae growth.

In an alternate embodiment, the support frame 1 may be eliminated. The suspension of the substrate 8 or growing medium could also be achieved via a simple flange 6 at the top of the bottle, some pins or small rods passing through the substrate 8, or even by simply relying on friction via a snug fit within the neck 21 of the bottle.

Figure 3:
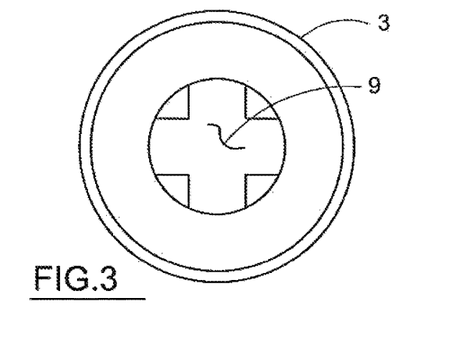
FIG. 3 is a top view of the bottle insert.

FIG. 3 is a top view of the bottle insert. The top retainer ring 3 is shown. The center of the top retainer ring 3 is open, so that the plant can grow out of the bottle insert 7 and out of the bottle 24. FIG. 4 is a side view of the bottle insert 7. In the embodiment shown in FIG. 4, the bottle insert 7 is comprised of an upper open frame segment 33 and a lower open frame segment 4. Between the vertical legs 5 are open slits or apertures 11. As shown, the support frame 1 may then comprise alternating vertical legs 5 and open slits or apertures 11 forming a circumferential surface, at places. A circumferential width of the open slits or apertures 11 may then be larger than a circumferential width of each of the vertical legs in the support frame 1. A lateral cross frame member 31 serves to add support to the vertical legs 5. The top retainer ring 3 also serves to support the bottle insert 7.

Figure 5:
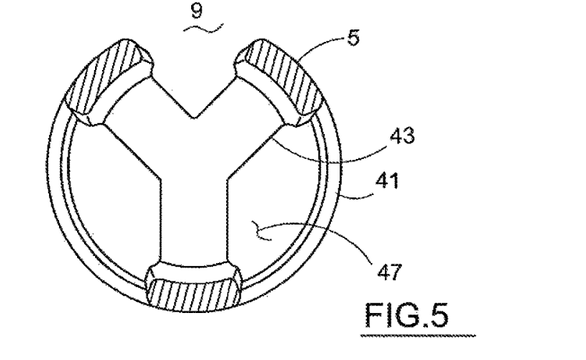
FIG. 5 is a cross-section view of the bottle insert from the perspective of section line B' to B".

FIG. 5 is a cross-section view of the bottle insert from the perspective of section line B' to B". The top of the vertical legs 5 are shown. As shown in FIG. 4, this bottle insert 7 has vertical legs 5 that extend the entire length of the bottle insert 7. Returning to FIG. 5, the bottle lip 41 is outside the vertical legs 5. The base arms 43 can be seen at the bottom of the bottle insert 7. The base arms 43 create apertures 47 for the roots to grow through. The base 9 couples the terminal portions of the vertical legs 5 and prevents the substrate from falling out of the open framework 33 and 4 of vertical legs 5. Preferably, base 9 is located at the bottommost ends of the open framework. However, the base may be located near, but not at, the terminal, bottommost ends of the framework.

FIG. 6 is a side view of another embodiment of the bottle insert 7. The bottle insert 7 has an upper open frame segment 33 that contains a first plant substrate 50. There is a lower open frame segment 4 that contains a second plant substrate 53. The first plant substrate 50 has minimal organic nutrients. The first plant substrate 50 has moderate wicking to wet soil surface. The second plant substrate 53 releases hydroponic nutrients into the water. The second plant substrate 53 has strong wicking capacity. In this embodiment, there are also multiple intermediate lateral cross frame members 31.

The substrate 8, 50 and 53 may be hydroponic growth medium composed of one more of the following: rock wool, perlite, vermiculite, common potting mix, sphagnum peat moss, pine bark, a combinatory amalgamation of peat moss and pine bark. In the preferred embadiment, the first plant substrate 50 is a stabilized mixture of organics, such as sphagnum peat moss, pine bark. In the preferred embodiment, the second plant substrate 53 is a stabilized spagnum peat moss plug that is enriched with nutrients. By way of example, the second plant substrate 53 is enriched by soaking it in nutrient solution and dried. A wide variety of nutrients can be used to enrich the substrate 8, including but not limited to, inorganic hydroponic nutrients, organic hydroponic nutrients and pH buffers.

When the self watering bottle insert 7 planter includes substrates 8 enriched with nutrients, a single plant 26 can be grown hydroponically without the use of external nutrients for the life of a plant 26. When inserted in a water reservoir or bottle filled with water, these highly leachable nutrient salts (>90% leach), dissolve into the water to create hydroponic nutrient solution. These nutrients can support a plant for its life cycle.

Figure 7:
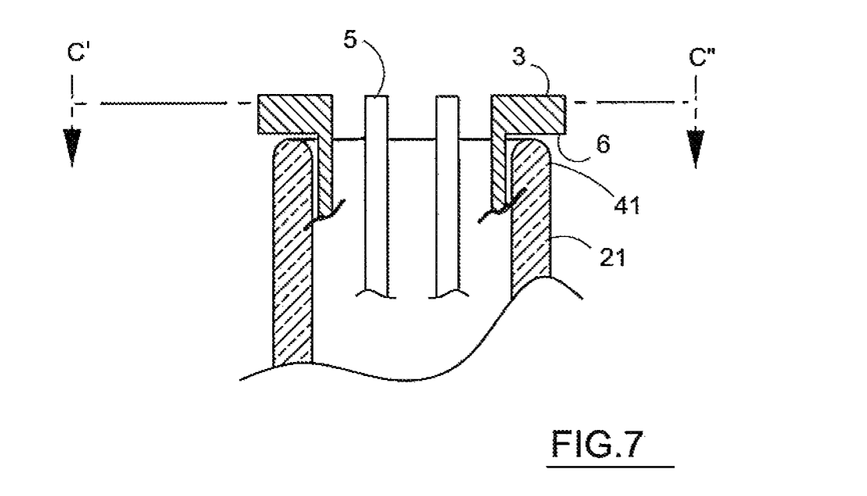
FIG. 7 is a close up, cut away view of the upper portion of the bottle insert in a bottle.

FIG. 7 is a close up, cut away view of the upper portion of the bottle insert 7 in a bottle 24. At the top of the bottle neck 21 is the bottle lip 41. The vertical legs 5 of the bottle insert 7 are seated inside the bottle neck 21. The flange 6 of the retainer ring 3 holds the bottle insert 7 on the bottle 24 and prevents the bottle insert 7 from dropping all the way into the bottle 24. The flange 6 rests on the bottle lip 41. The bottle insert 7 has a form factor adapted to fit within a bottle neck 21 having an inner diameter no larger than 22 mm and no smaller than 18 mm. The support frame has a length no greater than 130 mm. The flange 6 diameter is about 25 mm and the flange 6 depth is about 6 mm. The dimensions of the bottle insert are intended to allow the bottle insert to fit in about 90% of all wine or long bore bottles.

Figure 8:
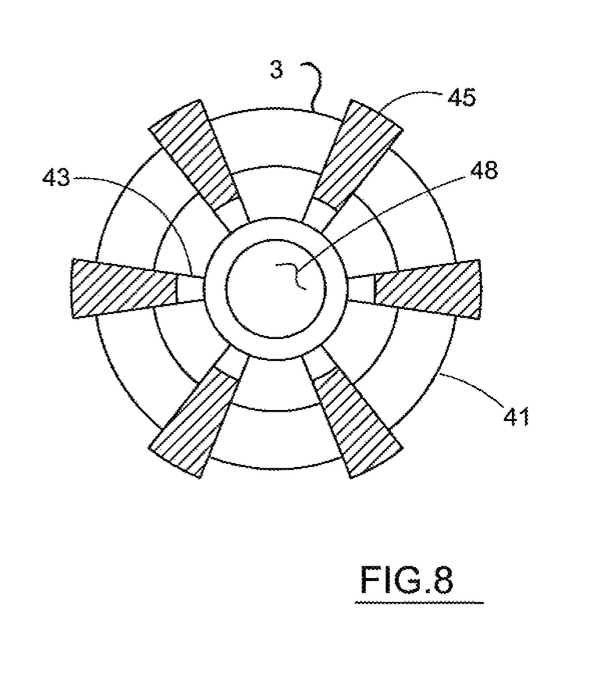
FIG. 8 is a top cross-section view of an alternate embodiment of the retainer ring from the perspective of section line C' to C".

FIG. 8 is a top cross-section view of an alternate embodiment of the retainer ring from the perspective of section line C' to C". This retainer ring 3 contains multiple arms 43 each ending in a retainer flange 45 for securing the bottle insert 7 onto the bottle 24 and preventing the bottle insert 7 from falling into the bottle 24. The retainer arms 43 are attached in the center to a ring that leaves an aperture 48 for the plant 26 to grow through.

Figure 9:
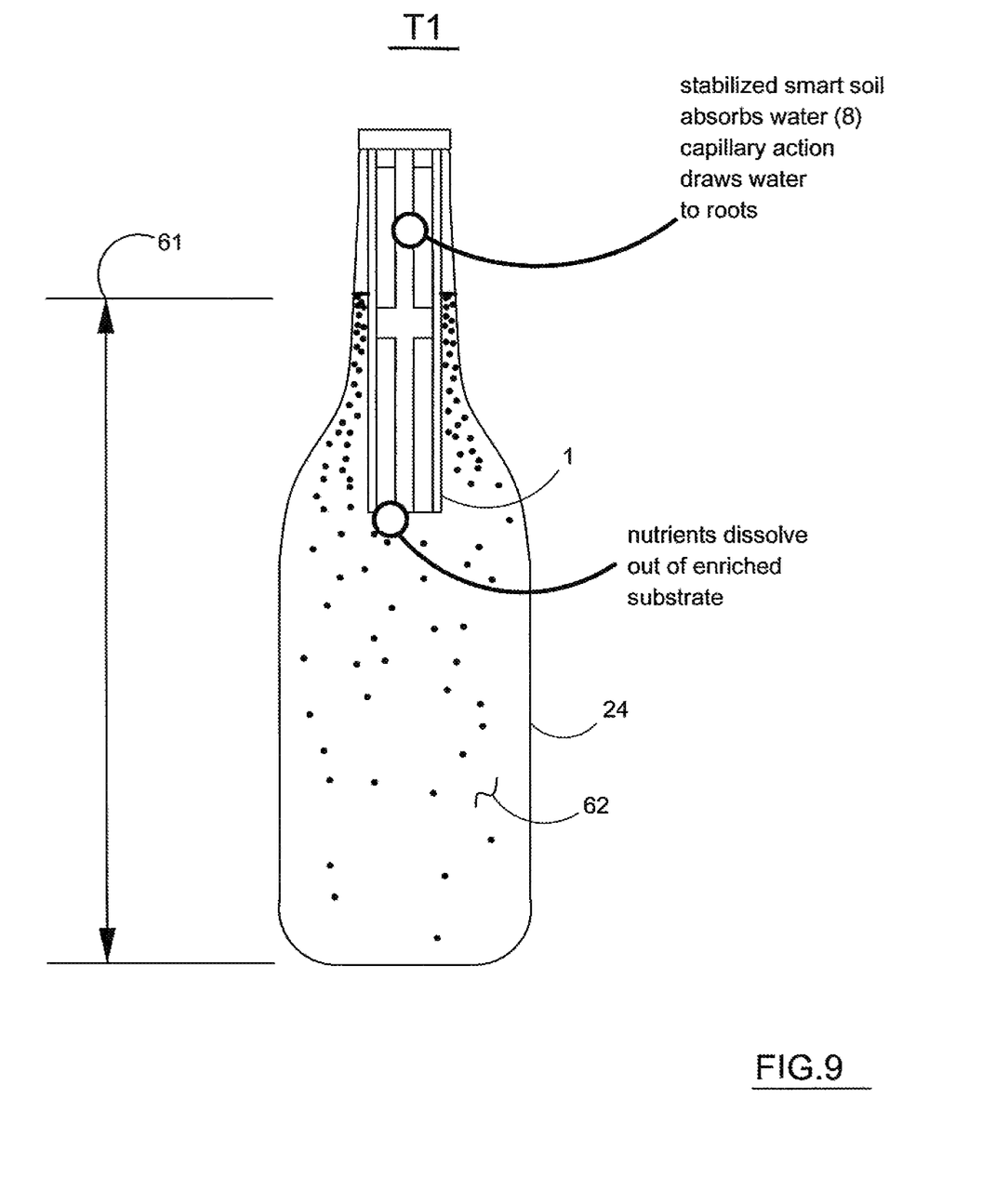
FIG. 9 is a side view of the bottle insert placed in a bottle with a full water level.
Figure 10:
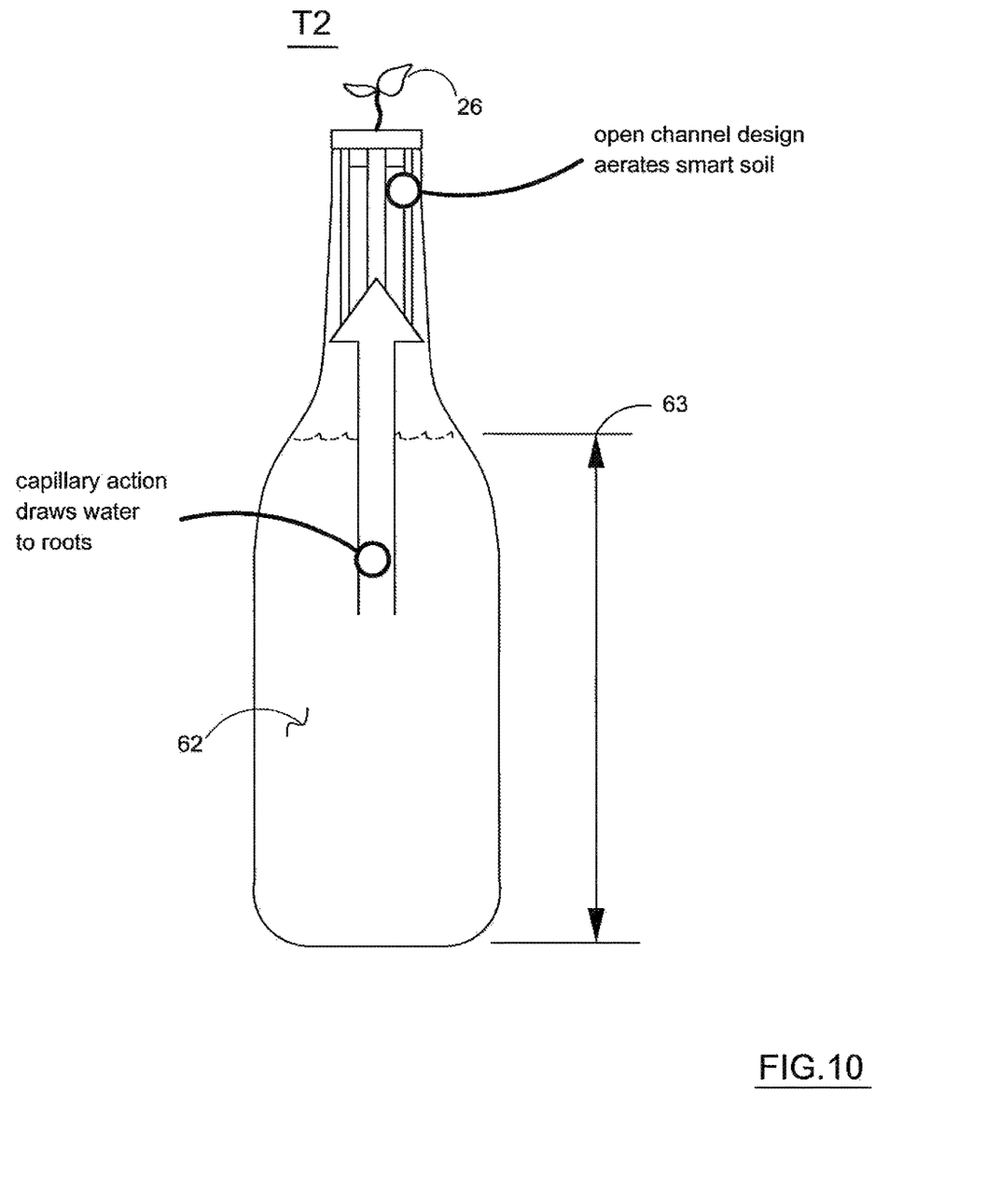
FIG. 10 is a side view of the bottle insert placed in a bottle with a moderate water level.
Figure 11:
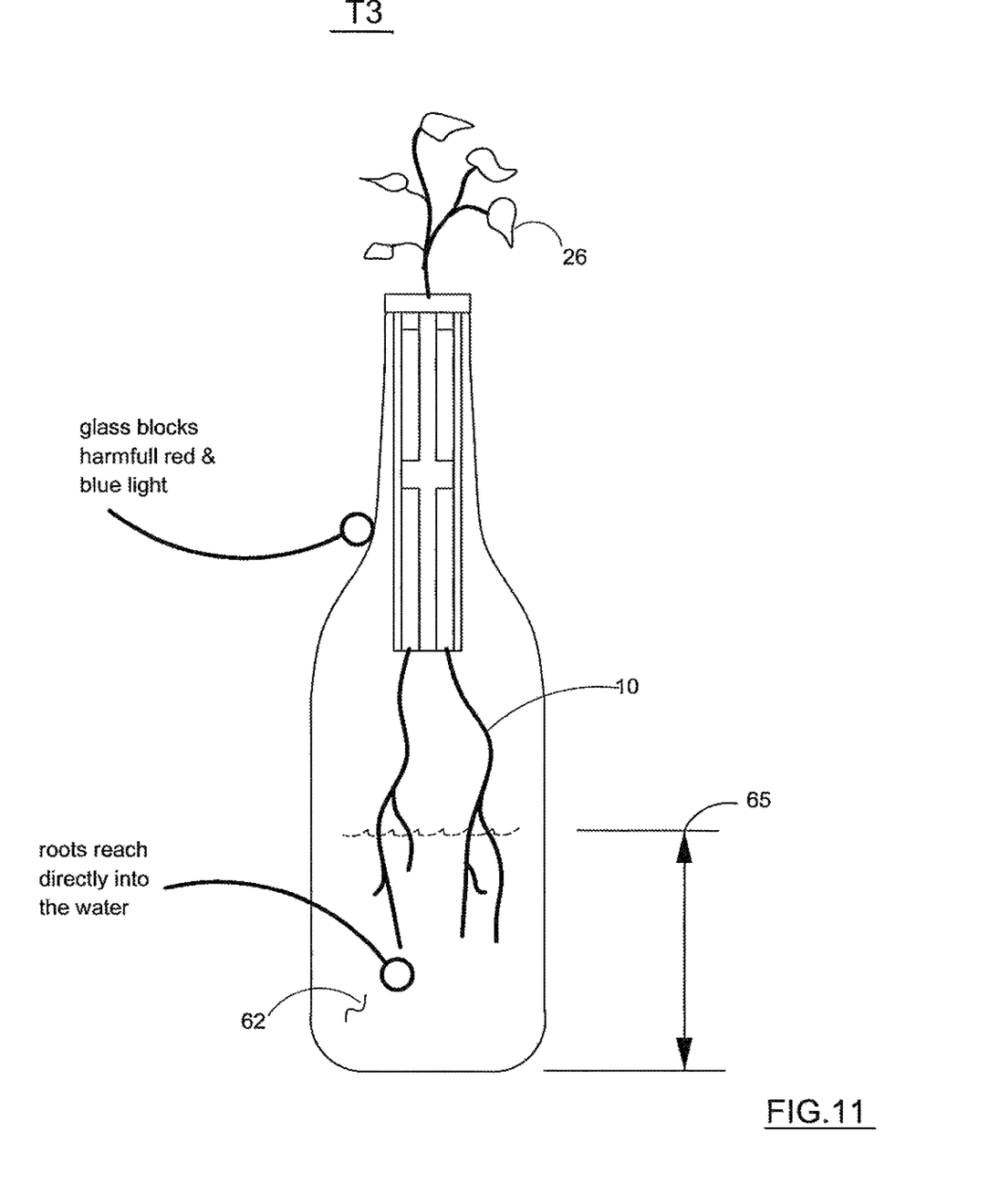
FIG. 11 is a side view of the bottle insert placed in a bottle with a low water level.

FIGS. 9, 10 and 11 are a series of drawings showing a self watering bottle insert inside a bottle and the growth cycle of a plant. FIG. 9 is a side view of the bottle insert placed in a bottle with a full water level 61. This is the beginning time period T1. The water level in the bottle 24 is at a high level 61. The self watering bottle insert 7 contains stabilized smart soil or substrate 8. The substrate 8 contains a seed or seeds. These seeds can be put in by the purchaser or pre-planted by the distributor of the self watering bottle insert 7. The water 62 in the bottle 24 is absorbed by the substrate 8. The absorption of the water 62 into the substrate 8 dissolves the nutrients out of the substrate 8 and leaches the nutrients into the water 62. The nutrient water 62 then provides nutrients to the plant or seeds.

In FIG. 10, shows a bottle 24 with a moderate water level 63. FIG. 10 is a side view of the bottle insert 7 placed in a bottle 24 with a moderate water level 63. This is the middle time period T2 and represents the beginning growth of the plant 26. The capillary action of the substrate 8 has drawn water 62 into the roots 10. The water level in the bottle 24 is at a moderate level 63. FIG. 11 is a side view of the bottle insert 7 placed in a bottle 24 with a low water level 65. This is the end time period T3 and represents the last growth stage of the plant 26. The roots 10 have now grown to reach directly into the water 62. The green or brown colored glass of the bottle 24 blocks harmful red and blue light, thus preventing algae growth. During time period T3 as shown in FIG. 11, the water may be re-filled as often as necessary to keep the roots below the water level 65.

Alternate embodiments can include various other substrates 8. Other substrates 8 might include common hydroponic grow-mediums such as rock wool, perlite, vermiculite or any one of a number of other materials. Common potting mix could also be an option. The main considerations are that the substrate 8 be suitable for supporting the seed and young plant, and that it not fall inside the bottle when wet. The ability to wick water up is desirable, but not essential.

Alternate embodiments could also include nutrients being added directly to the water as opposed to being in the substrate.

The claims appended hereto are meant to cover modifications and changes within the scope and spirit of the present invention.

What is claimed is:

1. A bottle insert for facilitating the growth of plants comprising:
 a support frame with a top retainer ring, an open framework of vertical legs having upper frame segments and lower frame segments, and a base coupling terminal portions of said vertical legs;
 a substrate encased in said open framework and adapted to support a plant root system, said substrate defining a wick adapted to vertically draw up liquid from a bottle container;
 at least one vertical aperture, wherein the at least one vertical aperture may be continuously vertically open or the at least one vertical aperture may have periodic lateral support segments to assure vertical stability wherein a circumferential width of the at least one vertical aperture in the circumference of the support frame is larger than a circumferential width of each of the vertical legs in the support frame;
 wherein the support frame is inserted into a neck of a bottle and retained atop said bottle by said top retainer ring.

2. The bottle insert of claim 1, wherein the substrate includes a first plant substrate and a second plant substrate, respectively disposed in said upper frame segments and lower frame segments.

3. The bottle insert of claim 2, wherein the first plant substrate is different than the second plant substrate.

4. The bottle insert of claim 1, wherein the substrate is enriched with nutrients, such that a single plant can be grown hydroponically without the use of external nutrients for the life cycle of the plant.

5. The bottle insert of claim 1, wherein the plant substrate is seeded or unseeded.

6. The bottle insert of claim 1, wherein the top retainer ring and upper frame segment with adjacent encased substrate define a breathable bottle stop.

7. The bottle insert of claim 1, wherein said base having lateral cross frame members prevents said substrate from falling downward in a bottle cavity.

8. The bottle insert of claim 1, wherein the substrate is a hydroponic growth medium composed of one more of the following: rock wool, perlite, vermiculite, common potting mix, sphagnum peat moss, pine bark, a combinatory amalgamation of peat moss and pine bark.

9. A bottle insert containing a plant substrate, said insert adapted to be inserted into a neck of a bottle, for facilitating growth of a plant and plant roots comprising:
- a support frame with a top retainer ring, an open framework of substantially parallel vertical legs having upper frame segments and lower frame segments, and a base coupling terminal portions of said vertical legs;
- said plant substrate encased in said open framework and adapted to support said plant root, said substrate defining a wick adapted to vertically draw up liquid in said bottle;
- wherein the support frame is substantially cylindrical, and is adapted to be inserted into said neck and retained atop said bottle by said top retainer ring,
- wherein the support frame further comprises at least one vertical aperture between the vertical legs of the open framework, and wherein a circumferential width of the at least one vertical aperture in the circumference of the support frame is larger than a circumferential width of each of the vertical legs in the support frame.

10. The bottle insert of claim 9, wherein the at one vertical aperture may be continuously vertically open or the at least one vertical aperture may have periodic lateral support segments to assure vertical stability.

11. The bottle insert of claim 10, wherein the at least one vertical aperture comprises at least three vertical apertures, and wherein the periodic lateral support segments are provided in all but one of the at least three vertical apertures.

12. The bottle insert of claim 9, wherein the top retainer ring is a continuous circumferential ring about the top of the support frame.

13. The bottle insert of claim 9, wherein the top retainer ring is a split ring having radial slots permitting the retainer ring to fit on slightly different bottle containers with slightly different diameter bottle openings, said radial slots defining a top portion of said open framework.

14. The bottle insert of claim 9, wherein the substrate includes a first plant substrate and a second plant substrate, respectively disposed either in said upper frame segments or said lower frame segments.

15. The bottle insert of claim 14, wherein one or the other or both said first plant substrate and second plant substrate contain a plant nutrient.

16. The bottle insert of claim 14, wherein said first plant substrate and second plant substrate contain a plant nutrient.

17. The bottle insert of claim 14, wherein the first plant substrate is different than the second plant substrate.

18. The bottle insert of claim 9, including lateral intermediate supports between said vertical legs.

19. The bottle insert of claim 9, wherein the plant substrate is seeded or unseeded.

20. The bottle insert of claim 9, wherein the support frame is plastic.

21. The bottle insert of claim 9, wherein the top retainer ring and upper frame segments with adjacent plant substrate defines a hydroponic growth medium and a breathable bottle stop.

22. The bottle insert of claim 9, wherein said base has lateral cross frame members preventing plant substrate from falling downward in said bottle.

23. The bottle insert of claim 9, wherein said base having lateral cross frame members spaced away from a base of the bottle.

24. The bottle insert of claim 9, wherein the plant substrate is a hydroponic growth medium composed of one more of the following: rock wool, perlite, vermiculite, common potting mix, sphagnum peat moss, pine bark, a combinatory amalgamation of peat moss and pine bark.

25. A bottle insert having a form factor adapted to fit within a bottle neck having an inner diameter no larger than 22 mm and no smaller than 18 mm, said bottle insert containing a plant substrate, said insert adapted to be inserted into said bottle neck of a bottle, for facilitating growth of a plant and plant roots comprising:
- a support frame with a top retainer ring, an open framework of vertical legs having upper frame segments and lower frame segments, and a base coupling terminal portions of said vertical legs, said support frame having a length no greater than 130 mm;
- said plant substrate encased in said open framework and adapted to support said plant root, said substrate defining a wick adapted to vertically draw up liquid in said bottle;
- wherein the support frame is adapted to be inserted into said neck and retained atop said bottle by said top retainer ring,
- wherein the support frame further comprises at least one vertical aperture between the vertical legs of the open framework, and wherein a circumferential width of the at least one vertical aperture in the circumference of the support frame is larger than a circumferential width of each of the vertical legs in the support frame.

* * * * *